(12) United States Patent
Hertel et al.

(10) Patent No.: US 12,306,914 B2
(45) Date of Patent: May 20, 2025

(54) CONSOLE-BASED NO-CODE/LOW-CODE THEME MANAGEMENT FOR AUTHENTICATION JOURNEYS

(71) Applicant: Ping Identity International, Inc., Denver, CO (US)

(72) Inventors: Andrew Lawrence Hertel, Washougal, WA (US); Craig Gering, Danville, CA (US); Katy Atkinson, San Francisco, CA (US); Colin Madigan Dean, Oakland, CA (US); Michael Elliott, Camas, WA (US); Volker Gunnar Scheuber Heinz, Georgetown, TX (US); Charles Daniel Masucci, Long Beach, CA (US)

(73) Assignee: Ping Identity International, Inc., Denver, CO (US)

( * ) Notice: Subject to any disclaimer, the term of this patent is extended or adjusted under 35 U.S.C. 154(b) by 609 days.

(21) Appl. No.: 17/696,739

(22) Filed: Mar. 16, 2022

(65) Prior Publication Data
US 2023/0297652 A1    Sep. 21, 2023

(51) Int. Cl.
G06F 8/33    (2018.01)
G06F 8/38    (2018.01)
G06F 21/31    (2013.01)

(52) U.S. Cl.
CPC ............ G06F 21/31 (2013.01); G06F 8/33 (2013.01); G06F 8/38 (2013.01)

(58) Field of Classification Search
CPC .................................... G06F 8/33; G06F 8/38
See application file for complete search history.

(56) References Cited

U.S. PATENT DOCUMENTS

| 8,719,776 B2* | 5/2014 | Eteminan | G06F 8/34 |
| | | | 717/124 |
| 8,898,629 B2* | 11/2014 | Hirsch | G06F 8/36 |
| | | | 717/107 |

(Continued)

OTHER PUBLICATIONS

Chang Young Hyun "Design and Implementation of a Low-Code/No-Code System"; International Journal of Advanced Smart Convergence vol. 8 No. 4 188-193 (2019)—Dept. of Smart IT, Baewha Women's University, Korea.*

(Continued)

*Primary Examiner* — Francisco J Aponte

(57) ABSTRACT

The disclosed technology teaches integrating theme management of user interfaces that implement an authentication journey for hosted services, receiving user input and responsively configuring a switch block node used in the journey. A first configured control of the node selects an authentication-related state variable to set a switch and a second configured control specifies alternative settings. Also receiving user input and responsively composing a script used in the node to process the state variable and select among the switch settings, responsive to the state variable, and receiving user input and responsively creating a visual branding theme. Further included is receiving user input and responsively composing a directed graph in which nodes that implement the authentication journey are connected, applying the themes to named theme nodes, positioning and connecting the switch block node to subsequent named theme nodes, to which the switch block node alternatively directs a flow of the journey.

16 Claims, 13 Drawing Sheets

(56) References Cited

U.S. PATENT DOCUMENTS

| | | | | |
|---|---|---|---|---|
| 9,064,240 | B2* | 6/2015 | March | G06F 8/10 |
| 9,864,674 | B2* | 1/2018 | Singi | G06F 11/3698 |
| 9,921,822 | B2* | 3/2018 | Torok | G06F 16/245 |
| 10,019,238 | B2* | 7/2018 | Patino-Bueno | G06F 8/20 |
| 10,397,345 | B2* | 8/2019 | Hwu | H04L 67/52 |
| 10,423,392 | B2* | 9/2019 | Rabins | H04W 56/0015 |
| 10,452,360 | B1* | 10/2019 | Burman | G06F 9/451 |
| 10,466,863 | B1* | 11/2019 | Guy | G06F 8/33 |
| 10,783,063 | B2* | 9/2020 | Lipke | G06F 11/3688 |
| 10,817,346 | B1* | 10/2020 | Culp | G06F 21/6218 |
| 10,831,981 | B2* | 11/2020 | Rajwat | G06F 40/186 |
| 10,896,035 | B1* | 1/2021 | Abdulhayoglu | G06F 8/60 |
| 11,954,460 | B1* | 4/2024 | Baker | G06F 8/35 |
| 2014/0258968 | A1* | 9/2014 | Brown | G06Q 10/06 717/103 |
| 2015/0142740 | A1* | 5/2015 | Behuria | G06F 16/27 707/634 |
| 2016/0104104 | A1* | 4/2016 | Ozkan | G06Q 10/087 705/28 |
| 2016/0173541 | A1* | 6/2016 | Gusain | H04L 65/403 715/212 |
| 2016/0274875 | A1* | 9/2016 | Farooqi | G06F 8/36 |
| 2017/0075659 | A1* | 3/2017 | Warren | G06F 8/40 |
| 2017/0098008 | A1* | 4/2017 | Kemmer | G06F 16/986 |
| 2017/0131978 | A1* | 5/2017 | Iyer | G06F 8/35 |
| 2017/0147324 | A1* | 5/2017 | Weber | G06F 8/65 |
| 2017/0357424 | A1* | 12/2017 | Hess | G06F 9/451 |
| 2018/0157467 | A1* | 6/2018 | Stachura | G06F 8/38 |
| 2018/0157468 | A1* | 6/2018 | Stachura | G06F 8/34 |
| 2019/0012047 | A1* | 1/2019 | Rodgers | G06F 16/116 |
| 2019/0187962 | A1* | 6/2019 | Stachura | G06F 8/38 |
| 2019/0392043 | A1* | 12/2019 | Wilson | G06F 8/31 |
| 2020/0092178 | A1* | 3/2020 | Nelson | G06Q 10/06316 |
| 2020/0125336 | A1* | 4/2020 | Mills | G06F 8/35 |
| 2021/0141616 | A1* | 5/2021 | Kane | G06F 8/35 |
| 2021/0255842 | A1* | 8/2021 | Levitt | G06F 8/34 |
| 2023/0067833 | A1* | 3/2023 | Varghese | G06F 8/34 |
| 2023/0367563 | A1* | 11/2023 | Viswambharan | G06F 8/36 |
| 2024/0028309 | A1* | 1/2024 | Lemoine | G06F 9/541 |
| 2024/0103814 | A1* | 3/2024 | Wang | G06F 8/34 |
| 2024/0419408 | A1* | 12/2024 | Liao | G06F 8/20 |

OTHER PUBLICATIONS

Tina Berani et al. "Adoption and Usability of Low-Code/No-Code Development Tools"; Proceedings of the Central European Conference on Information and Intelligent Systems—Faculty of Electrical Engineering and Computer Science, University of Maribor Koroska cesta 46, Maribor, Slovenia—Oct. 7-9, 2020.*

"Theme Node, Dynamically theme the ForgeRock out-of-the-box US on the fly", Oct. 2020, ForgeRock, Inc.,pp. 5 pgs (downloaded from https://web.archive.org/web/20201024234908/https://backstage.forgerock.com/marketplace/entry/AXCzY977aAqky-XCyaXV).

"Theme Node, Dynamically theme the ForgeRock out-of-the-box US on the fly", Apr. 2020, ForgeRock, Inc.,, 8 pgs (downloaded from https://github.com/vscheuber/ThemeNode).

McKendrick, What is low-code and no-code? A guide to development platforms, ZDNet, Mar. 3, 2021,9 pgs (downloaded from https://www.zdnet.com/article/special-report-what-is-low-code-no-code-a-guide-to-development-platforms/).

* cited by examiner

← Hosted Pages    ◇ Starter Theme                                                    Reset  Save

Global 522  Journey Pages  Account Pages

| | Global Settings |
| | Styles shared across all journeys and user account pages. |
| | Styles  Favicon  Settings |
| | Brand Colors 538 |
| | Brand Color |
| | #324054 |
| | Primary brand color used for buttons, checkboxes and switches. |
| | Brand Hover Color |
| | #242ec3 |
| | Secondary Color |
| | #69788B |
| | Color used for muted text. |
| | Danger Color |
| | #f2685b |
| | Color used to indicate a high-level alert. |
| | Typography 568 |
| | Font Family |
| | Open Sans |
| | Font applied to all journeys and customer-facing pages. |
| | Buttons 578 |
| | Buttons text Color #ffffff |
| | Button radius: 4 px |

Sign In
- Username
- Password
- Sign In
- Forgot password?

◇ Logo
- Dashboard
- Profile
- My Applications
- Users
- Shared

Barbara Jensen
bjensen@example.com

Barbara Jensen
bjensen@example.com
Edit Personal info

Account Security
Update your username, password and secondary method to protect your account
- Username
- Password
- 2-Step/Push Authentication Trusted Devices
Devices that have accessed your account.
(Trusted devices will appear here)

Toggle Sidebar    Account Pages  564

Journey Pages 562

FIG. 5

Organization
High Voltage
CrossFit High Voltage

Logo
1002

Details

SAML Config | Name
| High Voltage
|
| Description
| CrossFit High Voltage
|
| Parent Organization
| Broadcom Broadcom Owner Administrators | IDP Name
| http://www.crossfithighvoltage.com/exk1xse7f0z5UGDFD5d7

Members | IDP Type [saml, oldc, local]
| saml

Raw JSON | Domain
| crossfithghvoltage.com ×

| Asserted Domains

1032
| Journey

| Theme
| CFHV

◯ Enable MFA 1074

FIG. 10

CONSOLE-BASED NO-CODE/LOW-CODE THEME MANAGEMENT FOR AUTHENTICATION JOURNEYS

RELATED APPLICATION

This application is related to U.S. application Ser. No. 16/790,724 titled "Methods and Systems for Correctly Assembling Component Sequences", filed Feb. 13, 2020. The related application is incorporated by reference herein for all purposes.

FIELD OF THE TECHNOLOGY DISCLOSED

The technology disclosed relates generally to user authentication experience based on any input without needing to update applications. More specifically the disclosed technology relates to dynamic theme management for authentication journeys via no-code and low-code consoles which make it relatively easy for citizen developers to design, build and launch their organization-specific authentication journey quickly, without having to worry about the nuances of underlying operating systems or scalability requirements.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Secure access by customers to applications is an ongoing need for enterprises. Users of the applications authenticate before they can begin their work, using client applications including office software for documents, presentations, worksheets, databases, charts, graphs, digital paintings, electronic music and digital video. Additional application services include inventory management, messaging software, DBMS software, management software, CAD software, development software, gamification, virtualization, accounting, customer relationship management (CRM), Management Information Systems (MIS), enterprise resource planning (ERP), human resource management (HRM), talent acquisition, learning management, content management (CM), Geographic Information Systems (GIS) and service desk management. In one example, customers regularly create, edit, and save files via Microsoft Office 365 and Google Apps, among others, in a cloud environment.

When enterprise companies utilize applications to deliver services, they need to be able to customize authentication sequences for their customers in the cloud environment, to align with their policy requirements. When a new customer registers for an application, the cloud service creates a new customer environment. Before the new tenant can begin to use the new customer environment, an administrator needs to define the authentication sequence to be used by end users in the environment.

An opportunity arises for integrating theme management with an authentication journey for hosted services.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 3 through FIG. 5 show an interface for a theme designer that gives the ability to allow customers to change themes based on context or data.

FIG. 3 illustrates a user interface for setting up an organization global appearance theme for account pages in a theme builder.

FIG. 4 illustrates a user interface for setting up an organization global appearance theme for journey pages for a theme designer.

FIG. 5 illustrates a user interface setting up an organization global appearance theme for global settings.

FIG. 10 illustrates an example organization global appearance which expresses the characteristics specified for the user's membership in an organization.

DETAILED DESCRIPTION

Figure 1:
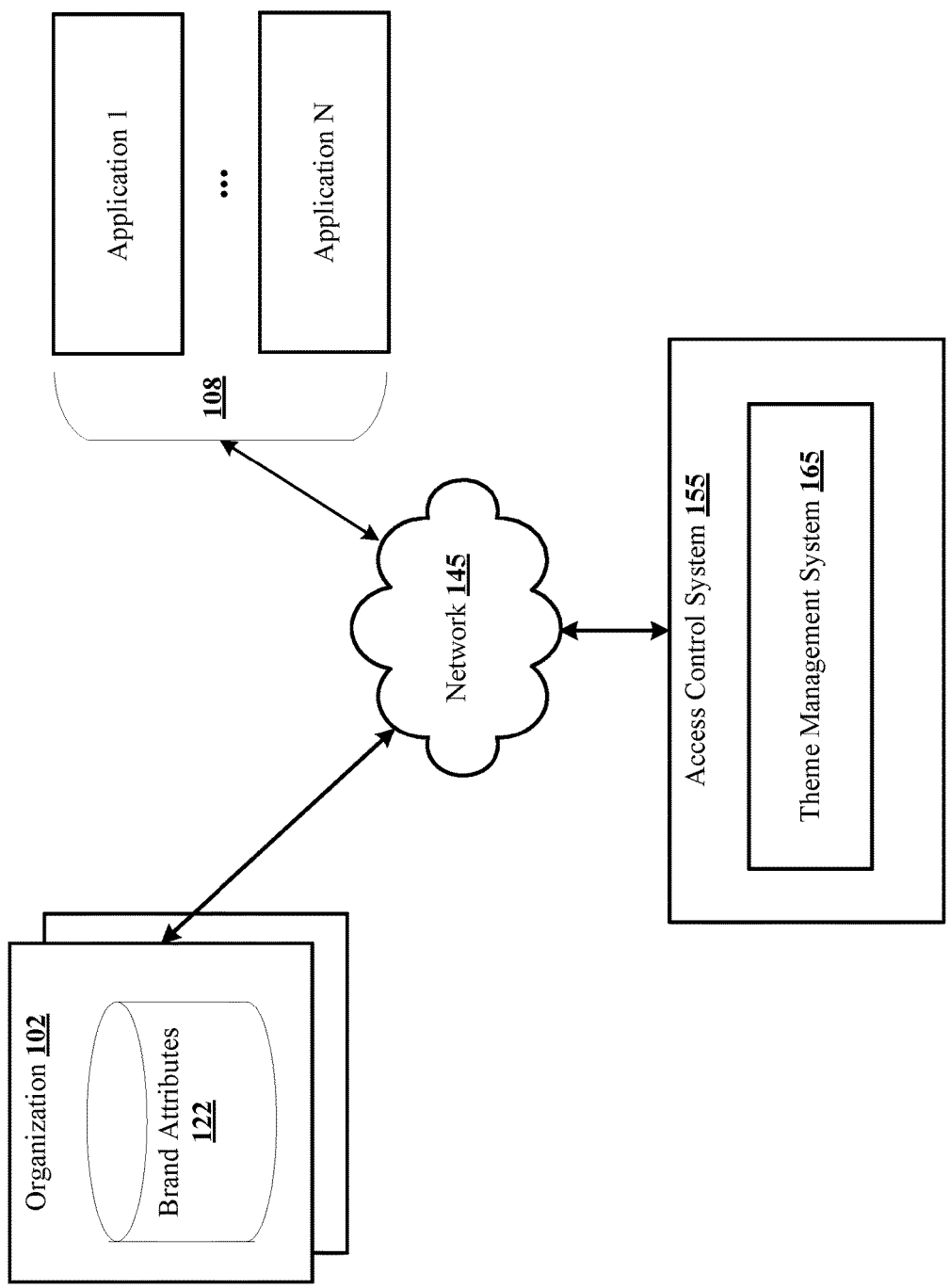
FIG. 1 shows an architectural level diagram of a system for integrating branding and themes with a no-code authentication journey for hosted services for interacting with a user, according to one embodiment of the disclosed technology.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Existing authentication user interfaces for applications can be challenging to write and customize with themes and brands that reflect the look and feel of user login and account pages based on contextual, behavioral and identity data.

In contrast, the disclosed technology for integrating branding and themes with a no-code authentication journey for hosted services for interacting with a user enables application administrators to construct multiple brands and themes quickly via an intuitive user interface, without writing computer programs or updating their applications. The applications need not be updated because the user experience for authentication is hosted in the applicant's cloud. The disclosed technology enables sending the user where they need to go for authentication while simultaneously branding the authentication journey.

A journey is an end-to-end workflow invoked by an end user or device. Common journeys are account registration and sign-in, as examples. The applicant's Identity Cloud platform provides templates for common end-user journeys, as described in U.S. application Ser. No. 16/790,724 titled "Methods and Systems for Correctly Assembling Component Sequences", and incorporated by reference herein for all purposes. Admins can use a drag-and-drop journey editor to configure or modify ready-to-use journey templates.

The disclosed technology enables ease of dynamic theming of authentication sequences based on context or data, which results in flexibility as brands and designs change, and in lower costs to implement specific authentication themes. The disclosed technology for changing user experience based on updates to themes and brands also applies to self-serve actions such as forgotten password and password reset sequences, and to registration sequences. Constructed executable authentication sequences can be modified and updated as requirements change.

The technology disclosed enables admins to copy themes and customize them or use out of the box themes, including themes built for users with visual impairments. Admins manage themes from a central console, so designers can readily manage branding from one location.

Examples of changing contexts and data that warrant the use of disclosed dynamic theming include audience segment, locale with language options, time-based exposure of features such as for a partial launch by marketing. The disclosed dynamic theming is also useful for customizing brand or subsidiary, user properties, browser type, header information, applying themes for users with visual disabilities, and step-up multifactor authentication (MFA).

The next section describes an environment for integrating branding and themes with a no-code authentication journey for hosted services for interacting with a user.

Architecture

FIG. 1 shows an architectural level diagram of a system 100 for integrating theme management with an authentication journey for hosted services. Because FIG. 1 is an architectural diagram, certain details are intentionally omitted to improve clarity of the description. The discussion of FIG. 1 is organized as follows. First, the elements of the figure are described, followed by their interconnections. Then, the use of the elements in the system are described in greater detail.

System 100 includes devices and systems that facilitate control of access to applications, including organization 102, access control system 155 and applications one through N 108. Organization 102 facilitates the specifying of information associated with a user of the enterprise system, such as profile data. Organization 102 is operable by a user who is associated with the enterprise, such as a security administrator. Exemplary profile data may include biographic information, such as a name, user identity and an address, along with enterprise-specific information such as an employment start date, title, grade level, department, manager name, reporting hierarchy, group, years of experience, physical location, and full time/part time designation. Organization 102 also includes brand attributes 122 with multiple authentication-related variables that are combinable to determine branding, including logos, background images, color pickers for typography and links, and configuration options for displaying on the right or left of a sign-in vCard), as well as options for expanded and collapsed versions. Additional brand attributes, such as sound effects could be stored in brand attributes 122 as well. Applications one through N 108 correspond to various computers, configured to perform specific tasks, such as an enterprise resource planning (ERP) system, a customer relationship management (CRM) system, and a supply chain management (SCM) system. Each of applications one through N 108 may implement a form of access control to prevent unauthorized access. Moreover, each of the various applications may have its own form of access control to prevent unauthorized access. As used herein, access to a system and/or an application operating on the system is referred to as an entitlement or privilege.

Continuing the description of system 100, access control system 155 responds to requests for access, coordinating authentication and consent gathering. Access control system 155 includes theme management system 165 for integrating branding and themes with a no-code/low code authentication journey for hosted services. An administrator of authentication security for the applicant can be the operator of the theme management system 165 in one implementation. Details and an example are described later in this document.

In the interconnection of the elements of system 100, network 145 couples organization 102, access control system 155 and target applications one through N 108 in communication. The communication path can be point-to-point over public and/or private networks. Communication can occur over a variety of networks, e.g., private networks, VPN, MPLS circuit, or Internet, and can use appropriate application program interfaces (APIs) and data interchange formats, e.g., REST, JSON, XML, SOAP. The communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX.

System 100 can be an assemblage of a sequence of components with a cloud-based computing service. The cloud-based computing service can be one of Google Cloud Platform (GCP), Amazon Web Services (AWS) or Microsoft Azure Virtual Platform.

Further continuing with the description of the system 100, components of FIG. 1 are implemented by software running on varying types of computing devices. Example devices are a workstation, a server, a computing cluster, a blade server, and a server farm, or any other data processing system or computing device. The engine can be communicably coupled to the databases via a different network connection.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Figure 2:
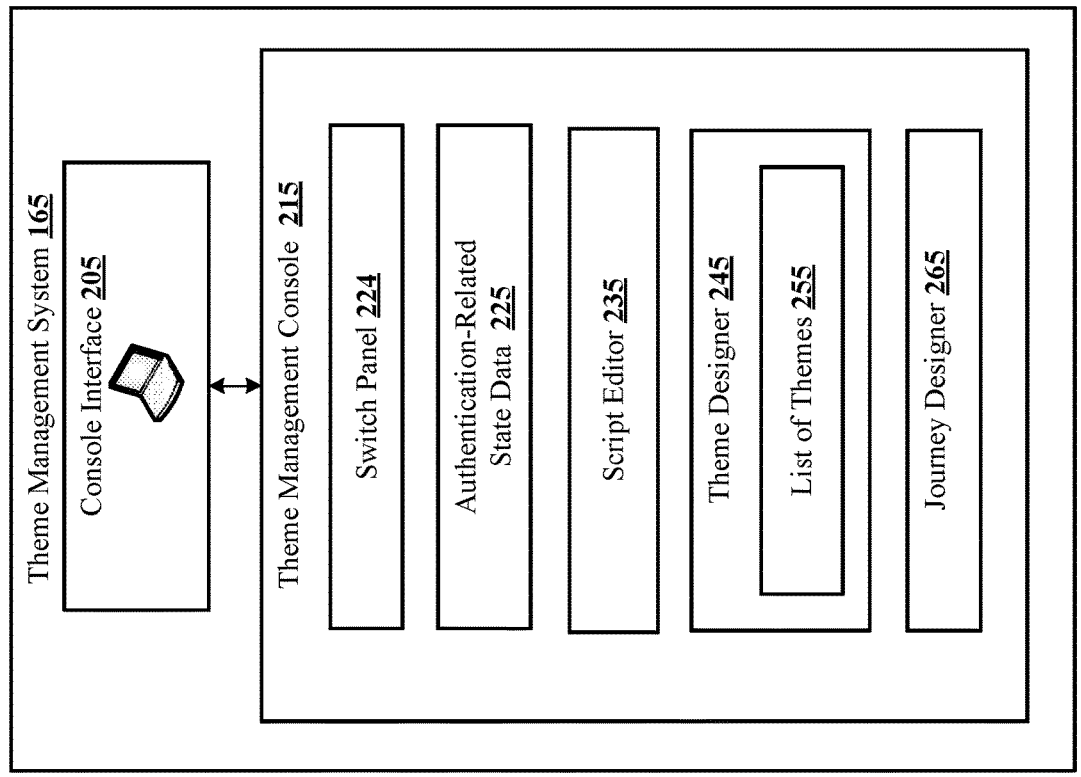
FIG. 2 shows a high-level block diagram for integrating branding and themes with a no-code authentication journey for hosted services for interacting with a user.

FIG. 2 illustrates a high-level block diagram 200 for integrating branding and themes with a no-code authentication journey, for hosted services, for interacting with a user of system 100. Block diagram 200 shows theme management system 165 with theme management console 215 and console interface 205. Theme management console 215 has a switch panel 224 for specifying switch block nodes in an authentication journey represented by a directed graph. One implementation of a switch panel means can be part of a drag-and-drop GUI for composing a directed graph with nodes of an authentication journey (means) connected by edges. A mouse or other tool can be used to draw a connection between the nodes, which the GUI represents with an edge. The GUI can be a remote rendering of a cloud-based platform, a light application running in a browser, or a fully local application. For the switch panel, the GUI supports configuration of a switch panel node, including switching logic and resulting exit paths from the node. A first control on the switch panel 224 selects an authentication-related state variable from which to set a switch, in authentication-related state data 225. A second control specifies alternative switch settings. The switch block node is available for drag-and-drop composition of the authentication journey. Paths originate from each switch position on the switch block node and lead to subsequent nodes in the authentication journey. We illustrate example authentication journeys in FIG. 6 through FIG. 9 and describe the examples below.

Continuing the description of FIG. 2, theme management console 215 also has a script editor 235 for editing a script that is used in the switch block node to process the authentication-related state variable and select among the alternative switch settings, responsive to a value of the state variable. A script editor means can be a visual editor used to compose and modify program scripts, such as a WYSIWYG editor. There are many examples of code editors that could be adapted for use as a script editor. Alternatively, but less conveniently, the script editor means could be a line file editor. That is, the script in the switch block uses authentication-related state data 225 to set a switch responsive to the state data. The switch can be depicted by switch positions on a node representing the switch block.

Further continuing the description of block diagram 200, theme management console 215 has theme designer 245 for creating a theme that defines visual branding, available information and/or available components that the authentication journey can be configured to implement, and journey designer 265 means for drag and drop composing a directed graph in which nodes of the authentication journey are connected. Theme designer 245 provides a means for customizing the way users experience and interact with sign-in and account pages. A theme designer means can be an artwork editor combined with a library manager for artwork that has been created and made available. An administrator can utilize theme designer 245 with a list of themes 255 including starter themes, existing themes developed previously, or can add a new theme for the organization. Theme designer 245 utilizes color pickers for typography and for links, a logo selector for a favicon, and a background image selector, in addition to an optional message to display right or left of a sign-in card, and can include expanded and collapsed versions of sign-in and account pages. Journey designer 265 has drag and drop means for composing a directed graph in which nodes of the authentication journey are connected, and includes applying the themes to named theme nodes, positioning the switch block node, and connecting the switch block node to subsequent named theme nodes, to which the switch block node alternatively directs a flow of the authentication journey. The directed graph utilizes switch block nodes, that can be linked to alternative themes controlled by the switch block nodes. Journey designer 245 connects the switch block nodes to the subsequent nodes in the journey tree.

The theme applied to the named theme node, once encountered while traversing the directed graph, applies to the authentication journey until the theme is changed. An executable authentication sequence, representable as a directed graph, is also referred to as a journey tree, with journey nodes connected to a no-code low-code (NCLC) state machine.

Figure 3:
Figure 4:
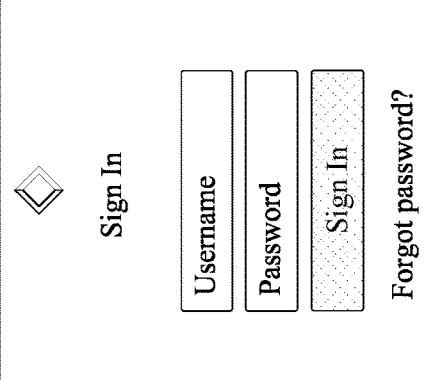

FIG. 3 through FIG. 5 show several views of an example user interface for a system for integrating theme management with an authentication journey for hosted services, allowing changing of themes for customers, based on context or data.

FIG. 3 illustrates a user interface window for setting up a global organization appearance theme for account pages 324 in theme designer 245. An administrator can customize the customer-facing pages such as account profile and dashboard, by controlling the styles, logo, and layout 348 for the account pages 324.

FIG. 4 illustrates a user interface setting up an organization global appearance theme for journey pages via theme designer 245. Settings for journey pages 424 enable an administrator to customize the authentication and registration journey pages, in one example, by controlling the styles, logo and layout 438 for the journeys, as well as specifics for header 458 and footer 478.

FIG. 5 illustrates a user interface setting up a global organization appearance theme for global settings 522. Global settings define styles shared across the journey pages 562 and user account pages 564 for an organization or division of an organization. Color pickers, usable for specifying brand colors 538, typography 568, and details such as button radius and color 578, are controllable globally using the theme user interface. Administrators can also customize background images and expanded and collapsed versions of pages, to signal brand identity for users of the interface.

Figure 6:
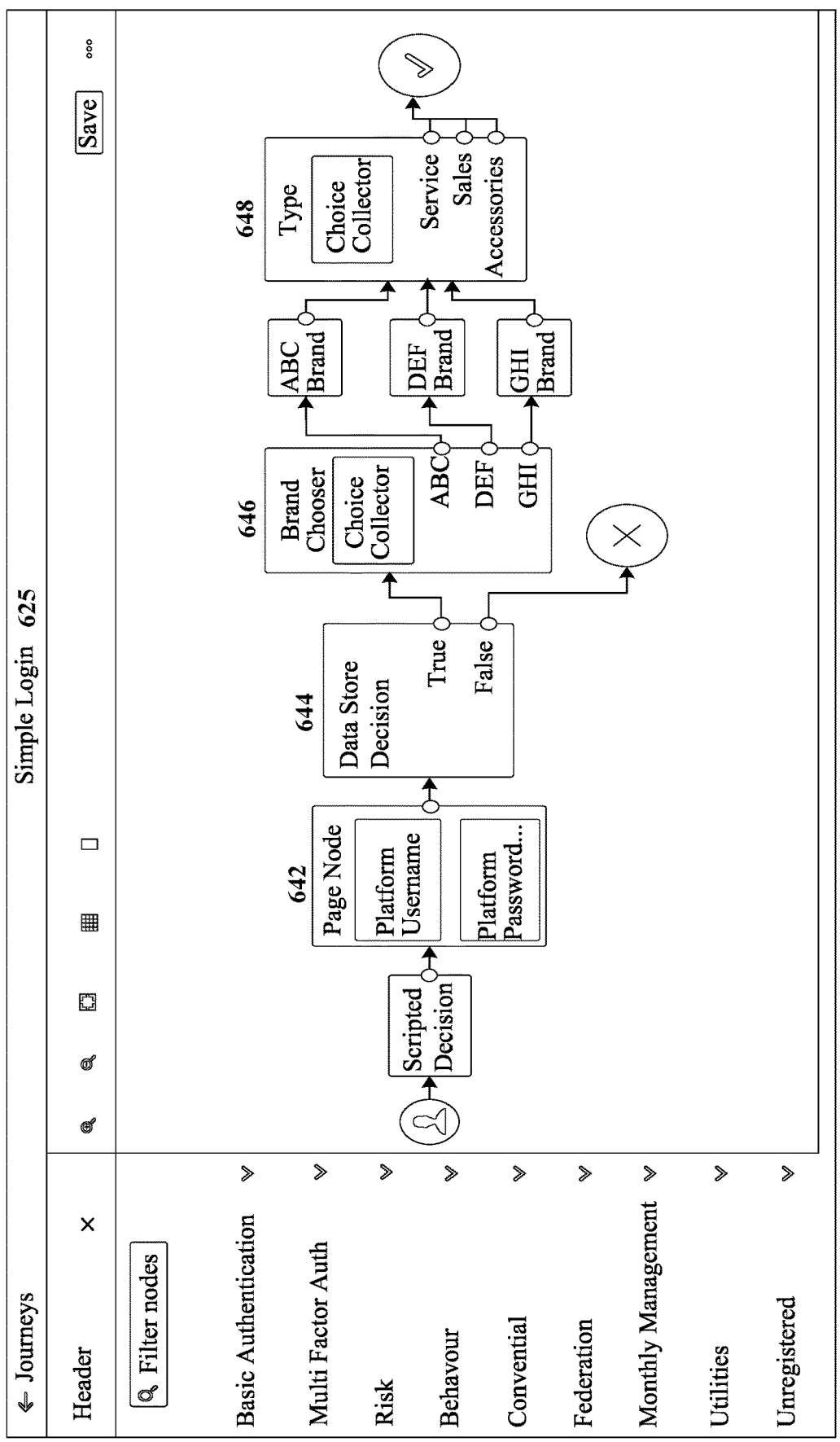
FIG. 6 shows a directed graph for a simple example login with a brand chooser as one of the journey nodes.

FIG. 6 shows a directed graph for a simple example login 625 with a brand chooser 646 as one of the journey nodes. In this example, when page node 642 receives a correct platform username and password, data store decision node 644 transmits a true value to switch block node "brand chooser" 646 and the switch block node processes the value of the "choice collector" authentication-related state variable and selects among the alternative switch settings, responsive to the value of the state variable, to decide which of the three themes among ABC Brand, DEF Brand and GHI Brand, to use as the theme for the organization pages, for node type 648. In this case, the choice collector authentication-related state variable value specifies one of service, sales and accessories. In a different example, the journey can be a registration, authentication, password breach detection, FIDO, push, forgot password, or forgot username. FIDO (Fast IDentity Online) authentication is a set of standards for fast, simple, strong authentication. These standards are developed by the FIDO Alliance, an industry association with representatives from a range of organizations including Google, Microsoft, Mozilla, and Yubico. The standards enable phishing-resistant, passwordless, and multi-factor authentication (MFA) that improve online UX by making strong authentication easier to implement and use. Push authentication is a mobile-centric authentication whereby the service provider sends the user a notification over the most secure available communication channel. The user responds to the challenge by performing an action to verify their identity and access the service.

Changing contexts and data warrant the use of disclosed dynamic theming, including audience segment, locale with language options, time-based exposure of features such as for a partial launch by marketing, brand or subsidiary, user properties, browser type, header information, applying a "theme by language" node 764 that detects the current browser language and sets the theme accordingly.

Detect language switch block node 734 utilizes a script to process the authentication-related state variable to set up the authentication journey to change the theme based on a user's language and select among the alternative switch settings, as listed next.

```
/* Select Theme by Browser Language
/* Select and apply theme based on the browser language in the request.
(function ( ) {
    /* Begin Script Configuration */
    // the script expects the themes to be named <baseTheme>_<language>, e.g. "Zardoz_en"
    var baseTheme = "Zardoz";
    // add all the language codes you want to support
    var supportedLanguages = ["de", "en", "fr"];
    // specify the default language to fall back on if the browser language is not a supported language
    var defaultLanguage = "en";
    /* End Script Configuration */
    /*******************************/
    outcome = "true";
    var theme = getThemeByLanguage(baseTheme);
    var fr = JavaImporter(
        org.forgerock.openam.auth.node.api.Action,
        org.forgerock.openam.authentication.callbacks.PollingWaitCallback
    )
    if (theme && callbacks.isEmpty( )) {
        var stage = "themeId=" + theme;
        action = fr.Action.send(
        new fr.PollingWaitCallback("0", "Please wait ...")
        ).with Stage(stage).build( );
    } else {
        action = fr.Action.goTo(outcome).build( );
    }
    /* Returns the name of the theme to select based on browser language. */
    function getThemeByLanguage(theme) {
        var languageHeader = getHeader("accept-language");
        var language = languageHeader.split(';')[0].split(',')[0].split('-')[0];
        if (supportedLanguages.indexOf(language) < 0) {
            language = defaultLanguage;
        }
        return theme + "_" + language;
    }
    /* Returns the value of the requested header /
    function getHeader(headerName) {
        return requestHeaders.get(headerName).get(0) + " ";
    }
}( ));
``` themes for users with visual disabilities, and step-up multifactor authentication (MFA).

Figure 7A:
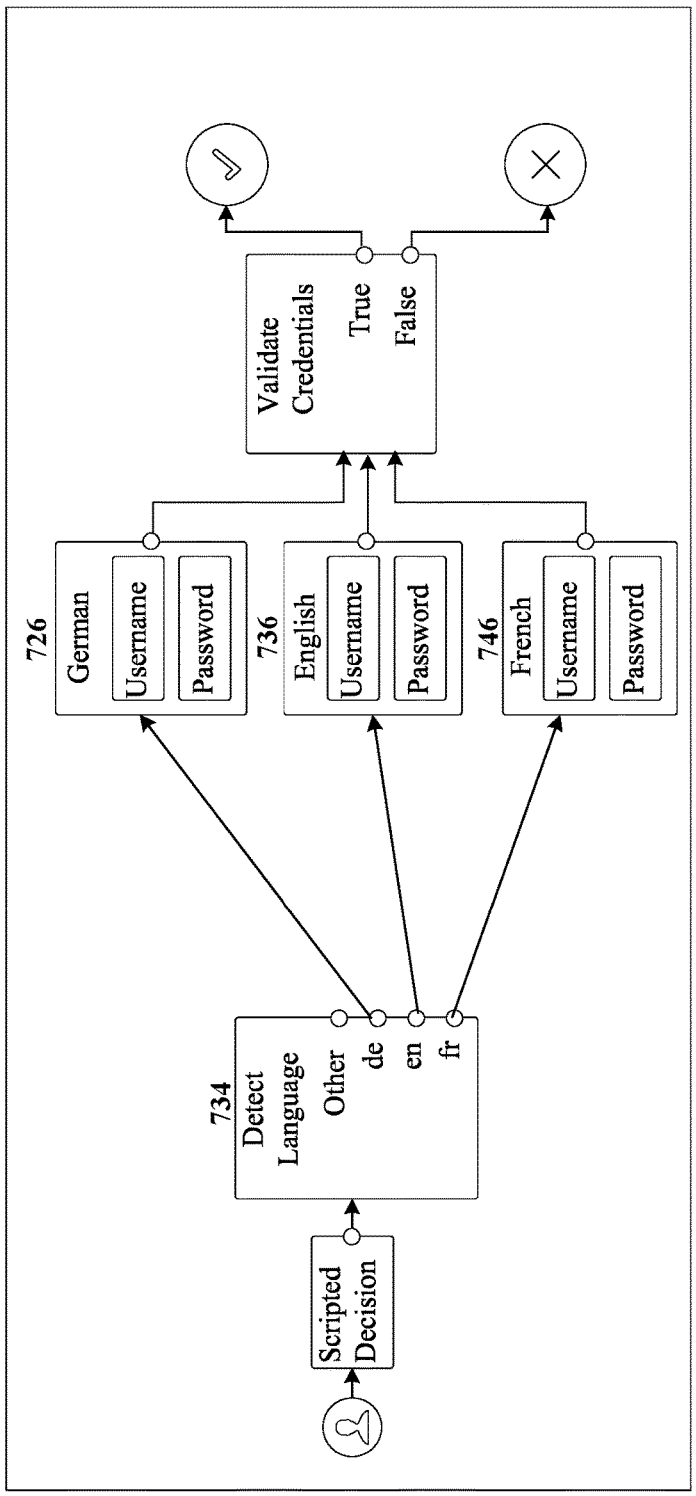
FIG. 7A illustrates a locale with language option use case for dynamic theming that integrates branding and themes with a no-code authentication journey.
Figure 7B:
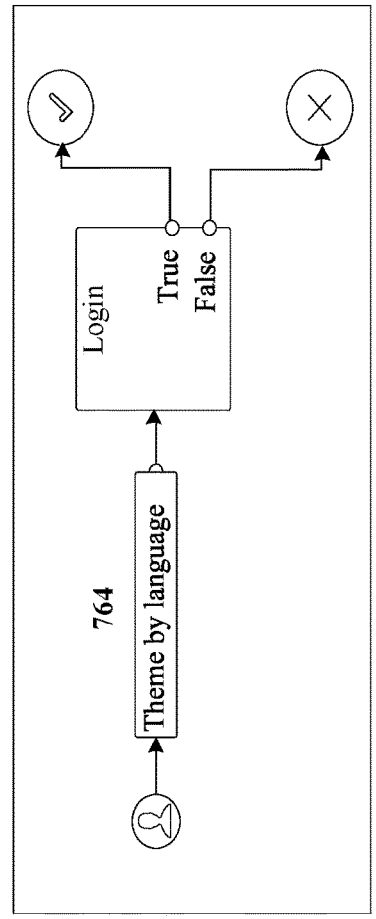
FIG. 7B shows a theme by language node that detects the current browser language and sets the theme accordingly.
Figure 8:
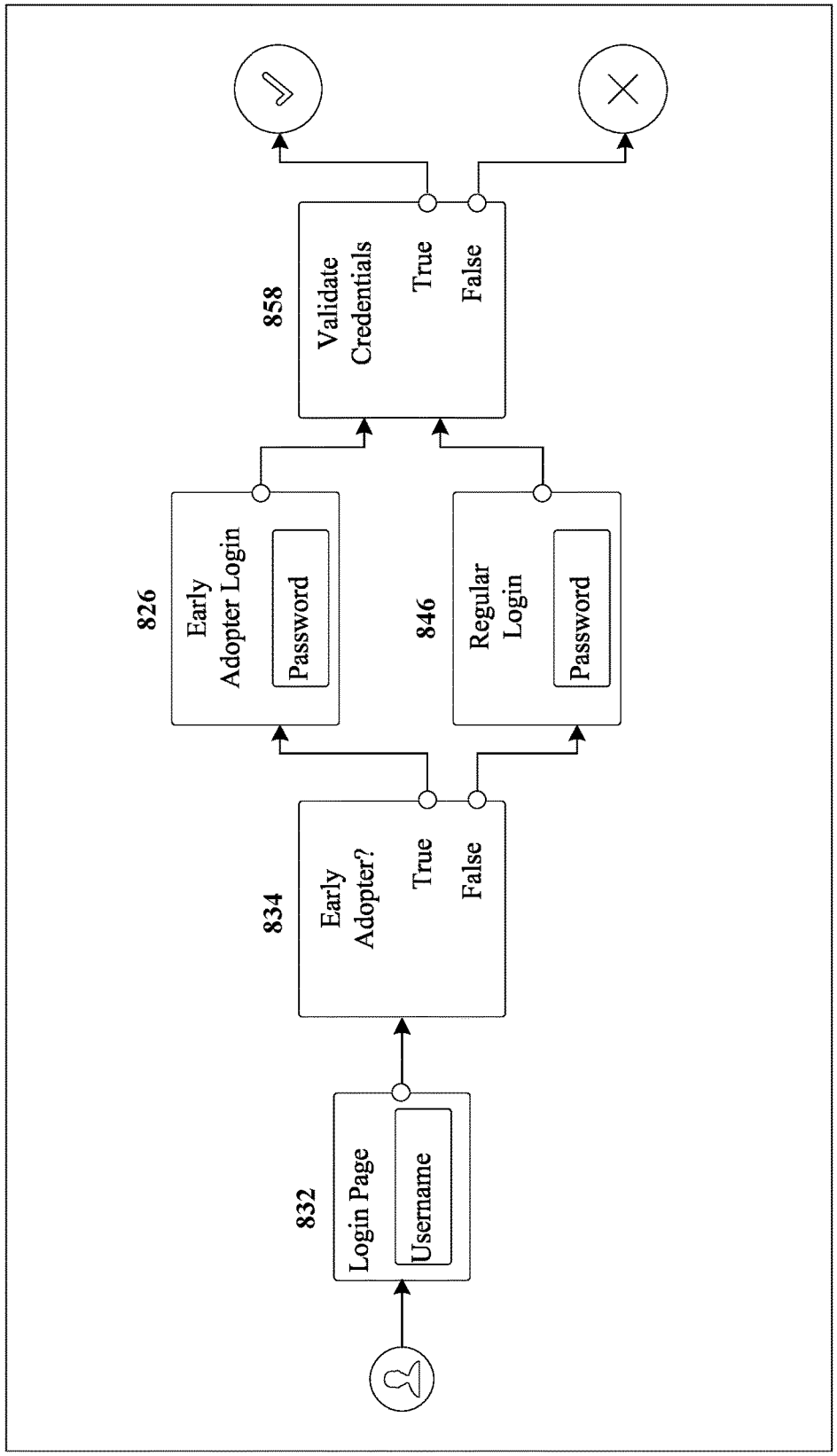
FIG. 8 illustrates an authentication journey that integrates theme management in the form of time-based exposure of features, such as a partial launch by marketing, using an early adopter theme.

FIG. 7A and FIG. 7B illustrate a locale with language options use case for dynamic theming that integrates branding and themes with a no-code authentication journey. The administrator can set up the authentication journey to change the theme based on a user's language. Inputs include the user's unique ID and the browser locale header. The authentication-related state variable is a language preference setting; the switch positions are language preferences offered by the language preference setting. A detect language switch block node 734 variable specifies alternative switch settings for the current browser language, then nodes branch into different named theme nodes, with each switch setting value activating the appropriate theme. In one example, themes include German 726, English 736 and French 746 page nodes. The directed graph starts with browser language detection and then the graph offers dynamic selection of theme based on the language input variable value. For example, French speaking users can read the page in French and view the French flag. In an alternative dynamic theming example for a locale with language options, FIG. 7B shows FIG. 8 illustrates an authentication journey that integrates theme management in the form of time-based exposure of features, such as a partial launch by marketing, using an early adopter theme. Based on the status of a user flagged as an early adopter, the system can expose a new feature, extending feature availability in combination with a time setting. The switch block node inputs for determining earlier adopter status are a user's unique ID, user properties associated with the unique ID which specify that the user is an early adopter, and time. The authentication journey is described next. Switch block node "early adopter?" 834 detects a user attribute that specifies what part of the user population the user is a member of, and whether the launch is within the date specified. Based on the values for the early adopter authentication-related state variable, the early adopter node 834 connects the switch block node to subsequent named theme nodes early adopter login 826 and regular login 846 and selects among the alternative switch settings, responsive to the value of the state variable as true or false. For the value of "true", the theme node early adopter login 826. Alternatively, for the value of "false", the flow of the authentication journey flows to regular login 846.

Figure 9:
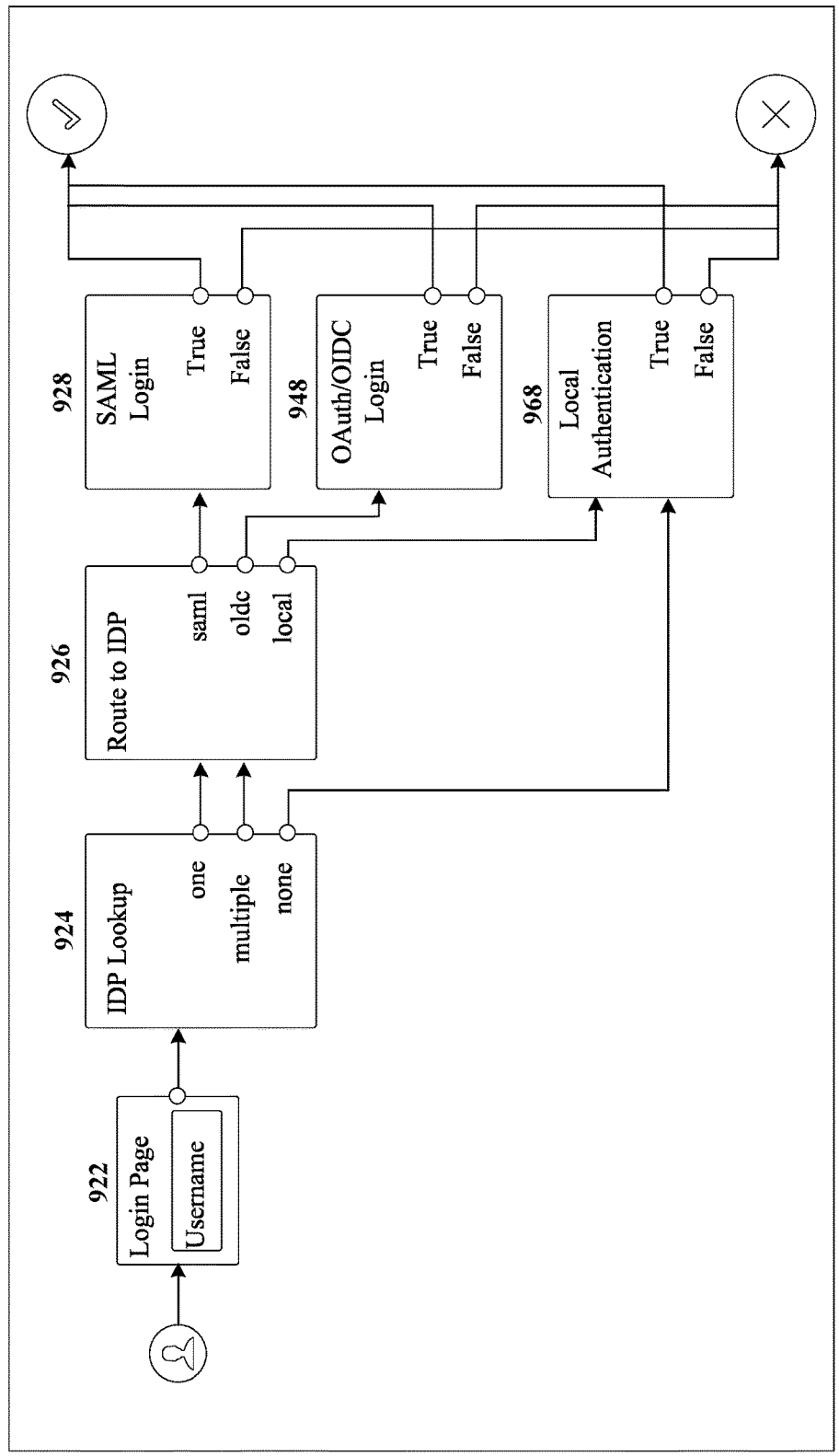
FIG. 9 illustrates an example authentication journey that integrates theme management based on the user's membership in an organization.

FIG. 9 illustrates an example authentication journey 900 that integrates theme management in the form of changing the brand based on the user's membership in an organization. An identity provider (IDP) creates, maintains and manages identity information for principals and applications within a federation or distributed network. In this use case, authentication journey 900 flows to switch block node IDP lookup 924 which utilizes a user's unique ID from a login page 922 to determine user organization, related to deployment architecture and distinct from user attributes. The journey tree detects the organization of which user is a member and presents a themed interface that matches the organization. A customer who logs in receives an authentication matching their expectations. In this case, three options are security assertion markup language (SAML) login node 928 for exchanging authentication and authorization data between parties; OAuth/OIDC login node 948 that utilizes decentralized authentication using the OAuth authorization framework protocol to allow a user to grant a third-party web site or application access to the user's protected resources, without necessarily revealing their long-term credentials or even their identity; and local authentication node 968.

Once encountered while traversing the directed graph, a theme applies to the authentication journey until the theme is changed.

FIG. 10 illustrates an example organization global appearance which expresses the characteristics specified for the user's membership in an organization. In this example, the organization global appearance for the enterprise "High Voltage" utilizes SAML configuration 1032 and represents the appearance using logo 1002 in the themed page. An admin can enable the option to require MFA authentication 1074.

Figure 11:
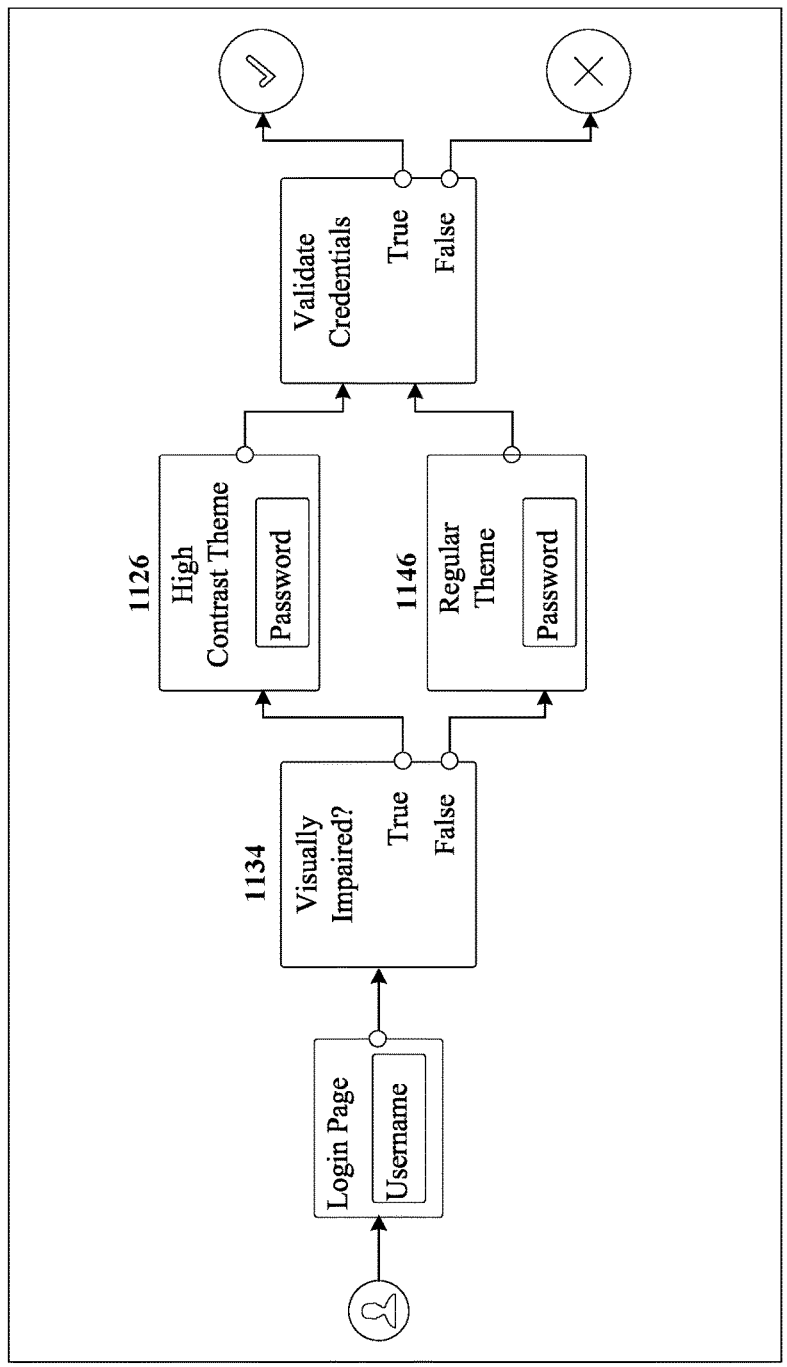
FIG. 11 illustrates an example use case of an authentication journey that integrates theme management in the form of changing the look and feel based on user accessibility properties, gleaned from the user ID presented at login.

FIG. 11 illustrates an example use case of an authentication journey 1100 that integrates theme management in the form of changing the look and feel based on user accessibility properties, gleaned from the user ID presented at login. Switch block node visually impaired 1134 can detect whether the user has visual impairment and direct the flow of the authentication journey to one of the subsequent named theme nodes high contrast theme 1126 or regular theme 1146. For a visually impaired user, the authorization journey flows to high contrast theme 1126 and the user can readily view the login UI with a high contrast theme.

Figure 12:
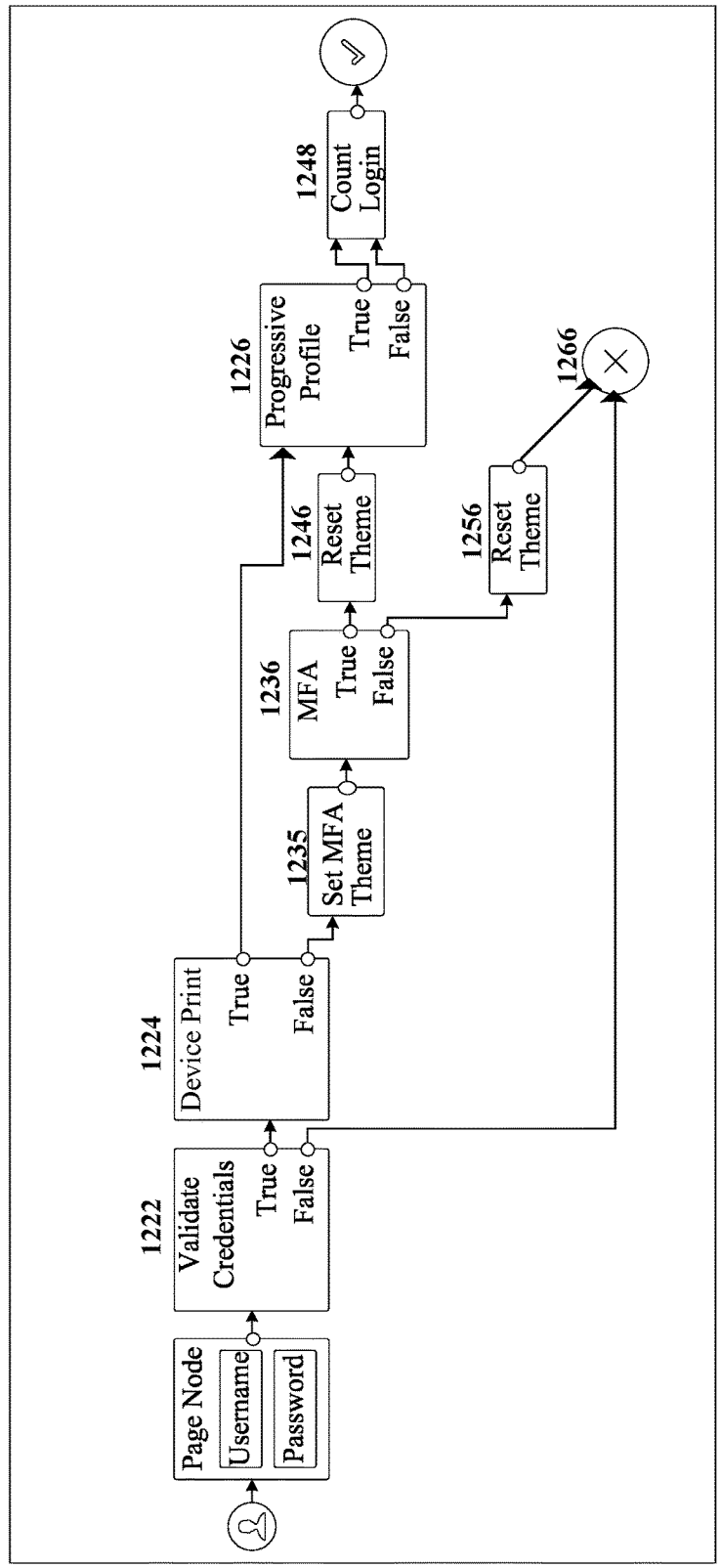
FIG. 12 illustrates an example authentication journey that integrates dynamic theme management in the form of changing the look and feel based on the delivery of step up MFA.

FIG. 12 illustrates an example authentication journey 1200 that integrates dynamic theme management in the form of changing the look and feel based on the delivery of step up MFA. The flow of the authentication journey is described next. When a user has not authenticated to a particular service before, changes in the theme are usable to identify a different color scheme so that the user is made aware that MFA validation needs to happen, using a theme such as using a red background for first time login. Validate credentials node 1222 directs flow of the authentication journey to route to device print 1224 theme node. If the credentials are determined to be false, validate credentials node 1222 directs flow of the authentication journey to block access 1266. If validate credentials node 1222 determined that the credentials are valid, authentication journey 1200 flows to device print 1224 which utilizes an authentication-related state variable that specifies and compares any collected device location metadata with values stored in the user's profile to determine if the authenticating user's device is located within range of somewhere they have authenticated from, and saved, previously. When the user has authenticated from a device in the recent past, device print 1224 maps to progressive profile 1226 node for login and count login 1248 counts the resultant login. For a first-time login, and for situations in which device print 1224 detects an unrecognized device and location, device print 1224 switch block node alternatively directs a flow of the authentication journey to set MFA theme 1235 node. Device print 1224 node can also optionally pull in authorization policy that applies to a sensitive resource. Set MFA theme 1235 node updates the theme seen by a user, so they recognize that they need to respond to MFA prompts. When a user successfully completes MFA, reset theme node 1246 updates the branding dynamically, and the authentication flows to progressive profile 1226 node for login and count login 1248 counts the resultant login. If a user does not complete MFA, reset theme node 1256 updates the branding dynamically. Suspicious users can get challenged to authenticate more strongly, as the authentication journey is rerouted to subsequent named theme nodes, which can be implemented as a honeypot, which is a computer security mechanism set to detect, deflect, or, in some manner, counteract attempts at unauthorized use of information systems; or they can be outright refused.

We describe a representative computer system for integrating theme management with an authentication journey for hosted services next.

Computer System

Figure 13:
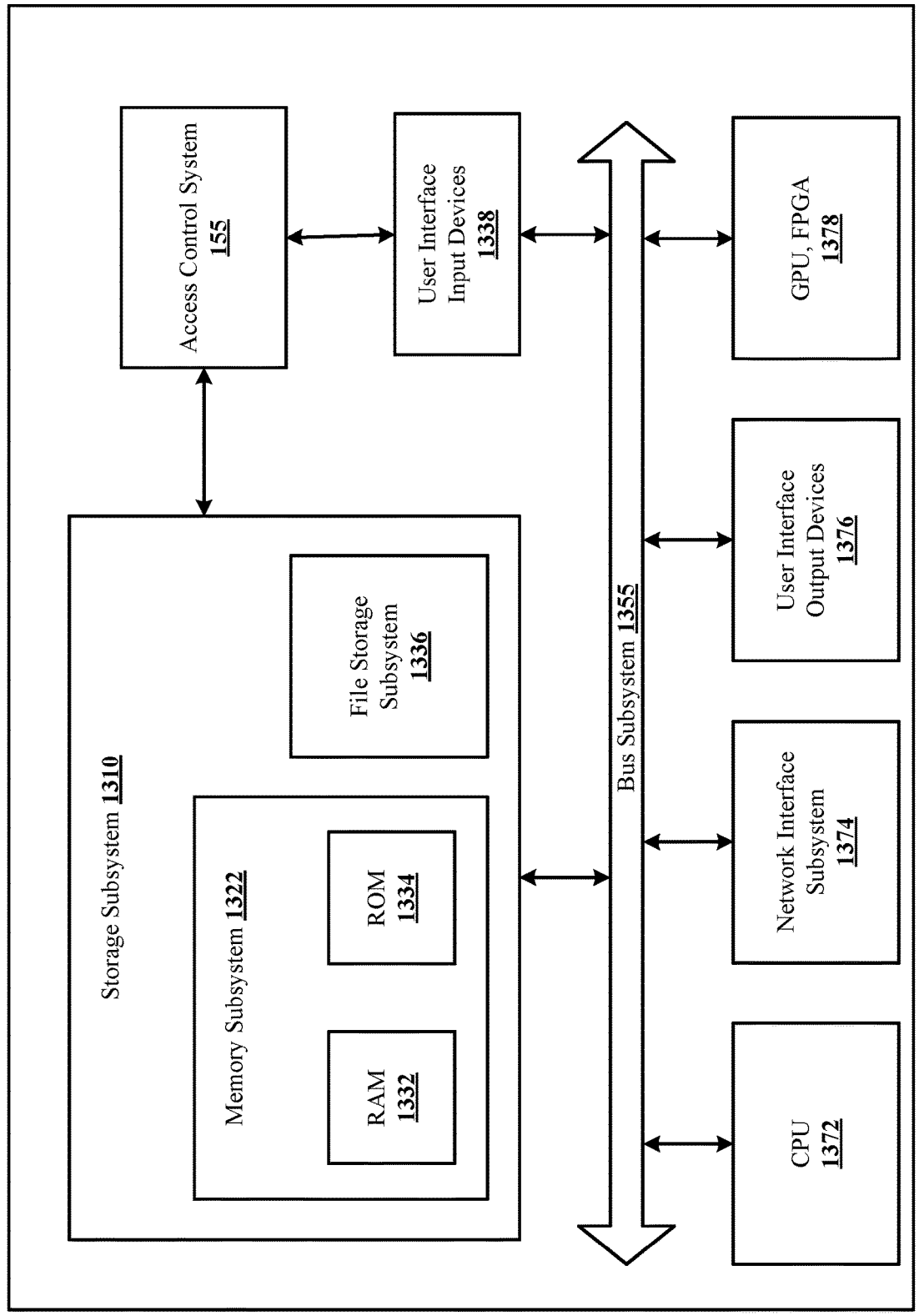
FIG. 13 is a simplified block diagram of a computer system that can be used for integrating theme management with an authentication journey for hosted services, according to one embodiment of the disclosed technology.

FIG. 13 is a simplified block diagram of a computer system 1300 that can be used for integrating theme management with an authentication journey for hosted services. Computer system 1300 includes at least one central processing unit (CPU) 1372 that communicates with a number of peripheral devices via bus subsystem 1355, and Access Control System 155, as described herein. These peripheral devices can include a storage subsystem 1310 including, for example, memory devices and a file storage subsystem 1336, user interface input devices 1338, user interface output devices 1376, and a network interface subsystem 1374. The input and output devices allow user interaction with computer system 1300. Network interface subsystem 1374 provides an interface to outside networks, including an interface to corresponding interface devices in other computer systems. Access Control System 155 is communicably linked to the storage subsystem 1310 and the user interface input devices 1338.

User interface input devices 1338 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1300.

User interface output devices 1376 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1300 to the user or to another machine or computer system.

Storage subsystem 1310 stores programming and data constructs that provide the functionality of some or all of the modules and methods described herein. Subsystem 1378 can be graphics processing units (GPUs) or field-programmable gate arrays (FPGAs).

Memory subsystem 1322 used in the storage subsystem 1310 can include a number of memories including a main random-access memory (RAM) 1332 for storage of instructions and data during program execution and a read only memory (ROM) 1334 in which fixed instructions are stored. A file storage subsystem 1336 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1336 in the storage subsystem 1310, or in other machines accessible by the processor.

Bus subsystem 1355 provides a mechanism for letting the various components and subsystems of computer system 1300 communicate with each other as intended. Although bus subsystem 1355 is shown schematically as a single bus, alternative implementations of the bus subsystem can use multiple busses.

Computer system 1300 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 1300 depicted in FIG. 13 is intended only as a specific example for purposes of illustrating the preferred embodiments of the present invention. Many other configurations of computer system 1300 are possible having more or fewer components than the computer system depicted in FIG. 13.

PARTICULAR IMPLEMENTATIONS

We describe some implementations and features for integrating theme management with an authentication journey for hosted services in the following discussion.

One implementation discloses a method for integrating theme management of user interfaces that implement an authentication journey for hosted services, including receiving user input and responsively configuring a switch block node used in the authentication journey, which is represented by a directed graph. A first control of the switch block node is configured to select an authentication-related state variable from which to set a switch and a second control is configured to specify alternative switch settings. The method also includes receiving user input and responsively composing a script that is used in the switch block node to process the authentication-related state variable and select among the alternative switch settings, responsive to a value of the state variable, and receiving user input and responsively creating a theme that defines visual branding, available information and/or available components that the authentication journey can be configured to implement. The method further includes receiving user input and responsively composing a directed graph in which nodes that implement the authentication journey are connected, including applying the themes to named theme nodes, positioning the switch block node, and connecting the switch block node to subsequent named theme nodes, to which the switch block node alternatively directs a flow of the authentication journey, and the theme applied to the named theme node, once encountered while traversing the directed graph, applies to the authentication journey until the theme is changed.

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

Some implementations of the method further include switch block nodes for at least language selection, added features, organization global appearance, automatically responding to accessibility properties, and step up authentication.

For many implementations of the disclosed method, organization global appearance includes at least colors from color pickers, links, logos, background images, and expanded and collapsed features. In many implementations, the directed graph in which nodes of the authentication journey are connected is assembled for use with a cloud-based computing service.

For many implementations of the disclosed method, the cloud-based computing service is one of Google Cloud Platform (GCP), Amazon Web Services (AWS) or Microsoft Azure Virtual Platform. For some implementations of the disclosed method, the cloud-based computing service is hosted on virtual or physical hardware local to a provider of the cloud-based computing service. The cloud computing service can utilize self-hosted cloud deployment, including ForgeRock's ID Cloud and cloud developer kit hosted on local virtual or physical hardware.

Other implementations of the disclosed technology described in this section can include a tangible non-transitory computer readable storage media, including program instructions loaded into memory that, when executed on processors, cause the processors to perform any of the methods described above. Yet another implementation of the disclosed technology described in this section can include a system including memory and one or more processors operable to execute computer instructions, stored in the memory, to perform any of the methods described above.

One implementation of a computer-implemented system for integrating theme management with an authentication journey for hosted services includes a switch panel means for specifying a switch block node used in an authentication journey represented by a directed graph, wherein a first control selects an authentication-related state variable from which to set a switch and a second control specifies alternative switch settings. The system also includes a script editor means for editing a script that is used in the switch block node to process the authentication-related state variable and select among the alternative switch settings, responsive to a value of the state variable. The system further includes a theme designer means for creating a theme that defines visual branding, available information and/or available components that the authentication journey can be configured to implement, and a journey designer drag and drop means for composing a directed graph in which nodes of the authentication journey are connected, including applying the themes to named theme nodes, positioning the switch block node, and connecting the switch block node to subsequent named theme nodes, to which the switch block node alternatively directs a flow of the authentication journey. The theme applied to the named theme node, once encountered while traversing the directed graph, applies to the authentication journey until the theme is changed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

What is claimed is:

1. A computer-implemented system for integrating theme management with an authentication journey for hosted services, including:
   a switch panel means for specifying a switch block node used in an authentication journey represented by a directed graph, wherein a first control selects an authentication-related state variable from which to set a switch and a second control specifies alternative switch settings;
   a script editor means for editing a script that is used in the switch block node to process the authentication-related state variable and select among the alternative switch settings, responsive to a value of the authentication-related state variable;
   a theme designer means for creating a theme that defines visual branding, available information and/or available components that the authentication journey can be configured to implement; and
   a journey designer drag and drop means for composing the directed graph in which nodes of the authentication journey are connected, including applying the theme to named theme nodes, positioning the switch block node, and connecting the switch block node to subsequent named theme nodes, to which the switch block node alternatively directs a flow of the authentication journey; and
   wherein the theme applied to a named theme node, once encountered while traversing the directed graph, applies to the authentication journey until the theme is changed.

2. The computer-implemented system of claim 1, further including switch block nodes for at least language selection, added features, organization global appearance, automatically responding to accessibility properties, and step up authentication.

3. The computer-implemented system of claim 2, wherein organization global appearance includes at least colors from color pickers, links, logos, background images, and expanded and collapsed features.

4. The computer-implemented system of claim 1, wherein the directed graph in which nodes of the authentication journey are connected is assembled for use with a cloud-based computing service.

5. The computer-implemented system of claim 4, wherein the cloud-based computing service is one of Google Cloud Platform (GCP), Amazon Web Services (AWS) or Microsoft Azure Virtual Platform.

6. A computer-implemented method for integrating theme management of user interfaces that implement an authentication journey for hosted services, including:
   receiving user input and responsively configuring a switch block node used in the authentication journey, which is represented by a directed graph, wherein a first control of the switch block node is configured to select an authentication-related state variable from which to set a switch and a second control is configured to specify alternative switch settings;
   receiving user input and responsively composing a script that is used in the switch block node to process the authentication-related state variable and select among the alternative switch settings, responsive to a value of the authentication-related state variable;
   receiving user input and responsively creating a theme that defines visual branding, available information and/or available components that the authentication journey can be configured to implement; and
   receiving user input and responsively composing the directed graph in which nodes that implement the authentication journey are connected, including applying the theme to named theme nodes, positioning the switch block node, and connecting the switch block node to subsequent named theme nodes, to which the switch block node alternatively directs a flow of the authentication journey; and
   wherein the theme applied to a named theme node, once encountered while traversing the directed graph, applies to the authentication journey until the theme is changed.

7. The computer-implemented method of claim 6, further including switch block nodes for at least language selection, added features, organization global appearance, automatically responding to accessibility properties, and step up authentication.

8. The computer-implemented method of claim 7, wherein organization global appearance includes at least colors from color pickers, links, logos, background images, and expanded and collapsed features.

9. The computer-implemented method of claim 6, wherein the directed graph in which nodes of the authentication journey are connected is assembled for use with a cloud-based computing service.

10. The computer-implemented method of claim 9, wherein the cloud-based computing service is one of Google Cloud Platform (GCP), Amazon Web Services (AWS) or Microsoft Azure Virtual Platform.

11. A tangible non-transitory computer readable storage media, including program instructions loaded into memory that, when executed on processors, cause the processors to implement a method of for integrating theme management of user interfaces that implement an authentication journey for hosted services, the method including:
   receiving user input and responsively configuring a switch block node used in the authentication journey, which is represented by a directed graph, wherein a first control of the switch block node is configured to select an authentication-related state variable from which to set a switch and a second control is configured to specify alternative switch settings;
   receiving user input and responsively composing a script that is used in the switch block node to process the authentication-related state variable and select among the alternative switch settings, responsive to a value of the authentication-related state variable;
   receiving user input and responsively creating a theme that defines visual branding, available information and/or available components that the authentication journey can be configured to implement; and
   receiving user input and responsively composing the directed graph in which nodes that implement the authentication journey are connected, including applying the theme to named theme nodes, positioning the switch block node, and connecting the switch block node to subsequent named theme nodes, to which the switch block node alternatively directs a flow of the authentication journey; and wherein the theme applied to a named theme node, once encountered while traversing the directed graph, applies to the authentication journey until the theme is changed.

12. The tangible non-transitory computer readable storage media of claim 11, further including switch block nodes for at least language selection, added features, organization global appearance, automatically responding to accessibility properties, and step up authentication.

13. The tangible non-transitory computer readable storage media of claim 12, wherein organization global appearance includes at least colors from color pickers, links, logos, background images, and expanded and collapsed features.

14. The tangible non-transitory computer readable storage media of claim 11, wherein the directed graph in which nodes of the authentication journey are connected is assembled for use with a cloud-based computing service.

15. The tangible non-transitory computer readable storage media of claim 14, wherein the cloud-based computing service is one of Google Cloud Platform (GCP), Amazon Web Services (AWS) or Microsoft Azure Virtual Platform.

16. The tangible non-transitory computer readable storage media of claim 14, wherein the cloud-based computing service is hosted on virtual or physical hardware local to a provider of the cloud-based computing service.

\* \* \* \* \*